United States Patent [19]

Delapierre et al.

[11] 4,255,238
[45] Mar. 10, 1981

[54] METHOD OF CONTROL FOR AN ELECTROLYTIC DISPLAY CELL AND ESPECIALLY A CELL OF THE METAL HALIDE TYPE AND A CIRCUIT FOR THE APPLICATION OF SAID METHOD

[75] Inventors: Gilles Delapierre, Seyssinet; Robert Meyer, Saint Ismier, both of France

[73] Assignee: Commissariat A. l'Energie Atomique, Paris, France

[21] Appl. No.: 48,222

[22] Filed: Jun. 13, 1979

[30] Foreign Application Priority Data

Jun. 19, 1978 [FR] France ............................... 78 18223

[51] Int. Cl.³ ...................... C25D 19/00; C25D 25/00
[52] U.S. Cl. ......................................... 204/18.1; 204/4;
204/5; 204/6; 204/180 R; 204/299 EC;
340/166 R; 340/756; 340/783; 340/793
[58] Field of Search ............... 204/299, 300, 301, 180,
204/181, DIG. 6, 1 R, 2, 3, 4, 6, 14 R; 96/1 R,
1.1, 1 E

[56] References Cited

U.S. PATENT DOCUMENTS

| | | | |
|---|---|---|---|
| 3,418,217 | 12/1968 | McMaster | 204/18.1 |
| 3,561,958 | 2/1971 | Kazan | 204/18.1 X |
| 3,695,870 | 10/1972 | Wakabayashi et al. | 96/1 E |
| 3,839,028 | 10/1974 | Tamai et al. | 96/1 R |
| 4,071,430 | 1/1978 | Liebert | 204/299 R |
| 4,093,534 | 6/1978 | Carter et al. | 204/299 R X |
| 4,123,346 | 10/1978 | LucPloix | 204/299 R |
| 4,126,528 | 11/1978 | Chiang | 204/299 R X |

*Primary Examiner*—Arthur C. Prescott

[57] ABSTRACT

The electrolytic display cell comprises a plurality of electrodes having suitable shapes for character display, a counter-electrode and an electrolyte. A negative voltage is applied to one of the electrodes for writing on said electrode and a positive voltage is applied for erasure. On completion of erasure, the voltage between electrode and counter-electrode has a tendency to rise to a threshold value corresponding to a parasitic reaction. The end of the erasure pulses is determined by the instant at which the electrode—counter-electrode voltage rises to the threshold voltage corresponding to the production of a parasitic reaction.

5 Claims, 6 Drawing Figures

METHOD OF CONTROL FOR AN ELECTROLYTIC DISPLAY CELL AND ESPECIALLY A CELL OF THE METAL HALIDE TYPE AND A CIRCUIT FOR THE APPLICATION OF SAID METHOD

This invention relates to a method of control for an electrolytic display cell and especially a cell of the metal halide type as well as to a circuit for the practical application of said method. The invention finds an application in the display of alphanumeric or analog characters.

In very general terms, an electrolytic display cell comprises an electrolyte containing a metal halide in the case which will now be given preferential consideration. Said electrolyte is inserted between semi-transparent electrodes having suitable shapes and a counter-electrode. A voltage source serves to bring the electrodes to predetermined potentials in order to carry out either the deposition of a metallic film (for displaying a character) or the re-solution of said film (for erasing the displayed character).

In a display device of this type, the thickness of the deposited metallic film is directly proportional to the electric charge which has passed through the cell. In order to erase said film completely, a charge of equal value must therefore pass through the cell but in the opposite direction. A charge deficiency at the time of erasure would result in accumulation of metal on the electrode and, conversely, an excess of charge at the time of erasure could give rise to secondary reactions in the electrolyte.

Should the metal salt be a metal halide such as silver iodide or bromide, the iodine or bromine which may be evolved in the electrolytic solution during the parasitic reactions mentioned above does not expose the device to any real hazard since it recombines with the silver of the deposited layers or with the silver of the counter-electrode.

This property and advantage of the silver halides are mentioned in particular in French patent application No. 76 18919 of June 22, 1976 in the name of the present applicant.

Although an excess of charge at the time of erasure may therefore not constitute a disadvantage in regard to the composition of the electrolytic solution, it does nevertheless limit the speed of switching of the display device. If the display device is intended to have a uniform appearance, it is in fact preferable to wait until the entire quantity of iodine or bromine previously formed on the electrode has recombined chemically with the silver. The length of the waiting period corresponds to the charge overshoot or extent to which the erasure charges have been exceeded.

In the final analysis, it is therefore endeavored to reduce said charge overshoot. However, two difficulties arise from this reduction in the case of devices of the prior art as illustrated in FIGS. 1 and 2.

FIG. 1 illustrates an electrolytic display cell 2 comprising electrodes 4, a counter-electrode 6 and an electrolytic solution 8; this cell is controlled by a circuit comprising two complementary MOS transistors 10 and 12 having respectively a p-type channel and an n-type channel, the erasure and writing signals Ef and Ec respectively being applied to the gates of said transistors. The device is supplied by two voltage sources 14 and 16 (usually consisting of dry cells having a voltage of 1.5 V, for example).

During the period of writing, the transistor 12 is in the conducting state whilst the transistor 10 is in the conducting state during the period of erasure. The writing current therefore depends on the resistance of the channel of the transistor 12 and the erasure current depends on the resistance of the channel of the transistor 10. In point of fact, the values of these resistances are subject to a certain dispersion from one transistor to another with the result that, if it is desired to obtain a minimum charge overshoot at the time of erasure, said overshoot must be adjusted to the most unfavorable case. In some cases, however, said charge overshoot may then become excessive.

Moreover, the dry cell 14 used for erasure deteriorates at a higher rate than the dry cell 16 which is used for writing since the erasing operation consumes a slightly larger quantity of charges than the writing operation. The voltage delivered by the erasure dry cell 14 may drop to 1.2 V, for example, whereas the voltage delivered by the writing cell 16 retains its value of 1.5 V. The circuit must therefore be so designed as to produce a correct overshoot even in the event of unbalance of the supply sources.

However, this entails the need for an erasure charge overshoot of at least 20% when the two dry cells are new and both deliver the same voltage, which is prohibitive.

One of the expedients initially contemplated by the inventors for solving this problem of dissymmetrical dry cell deterioration is illustrated in FIG. 2. The circuit shown in this figure comprises two complementary transistors 20 and 22 and a single voltage source 24 which serves both for erasing and for writing. The counter-electrode 6 is connected to two other transistors 26 and 28, the former being conductive during the writing operation and the latter being conductive during the erasing operation.

The solution suffers from a major drawback: all the currents which flow through the different electrodes of the cell pass through the transistors 26 and 28 which must therefore be of large size, with the result that they are costly to produce. Furthermore, it is impossible by means of this circuit to write one electrode while erasing another and thus to divide the response time of the display device by two. This drawback is accompanied by an objectionable appearance of displayed characters at the moment of a character change. For example when changing from the display of a 2 to the display of a 3 in a seven-segment device, the following three characters are seen in succession:

$$\exists \quad \exists \quad \exists$$

The invention is precisely directed to a method and a device which make it possible to solve all these difficulties. With this objective, and in order to initiate erasure on one electrode, there is applied to this latter a voltage in the vicinity of the electrochemical halogen-formation voltage or, more generally, of the voltage corresponding to the production of a parasitic reaction. The end of the erasure pulses is determined by the instant at which the electrode—counter-electrode voltage rises to the threshold value corresponding to the production of a parasitic reaction. Thus as long as the metal is present on the electrode, dissolution takes place at a relatively high current intensity (the threshold voltage of dissolution of the metals employed, especially silver, is practically zero). As soon as the dissolution is completed, the current either falls to zero or to a very low value since the threshold voltage which is necessary for the formation of the halogen (in practice either iodine or bromine) in the vicinity of the applied voltage.

Should it be desired to have a zero current on an erased electrode, the erasure voltage will be maintained at a slightly lower value than the threshold voltage of electrochemical formation of halogen.

Should it be desired to benefit by a small leakage current on the erased electrodes (in order to perfect re-solution of the metal on any surface defects), the erasure voltage will be maintained at a slightly higher value than the halogen-formation threshold voltage.

In the event that the metal halide is silver iodide, an erasure voltage of the order of $+0.7$ V is applied if it is desired to maintain a small current after dissolution and a voltage of the order of $+0.5$ V is applied if this is not required.

The present invention is also directed to the control circuit of an electrolytic display cell for the practical application of the method hereinabove defined. The display cell comprises a plurality of electrodes having shapes suited to the display of characters, a counter-electrode and an electrolyte having a metal halide base. The circuit comprises a first source of negative writing voltage, a second source of positive erasure voltage and a switching element for connecting each electrode either to said first source or to said second source. The circuit in accordance with the invention is distinguished by the fact that said second source delivers an erasure voltage which is close in value to the threshold voltage of electrochemical halogen formation, and that the switching element continuously connects the electrode to be erased to said second source.

The circuit according to the invention exists in two alternative embodiments according as the second source delivers an erasure voltage which is slightly lower or higher than the threshold voltage of electrochemical halogen formation.

The distinctive features and advantages of the invention will in any case become more readily apparent from the following description of exemplified embodiments which are given by way of explanation and not in any limiting sense, reference being made to the accompanying drawings in which:

FIG. 1 described earlier illustrates a control circuit of the prior art in which provision is made for a writing voltage source and an erasure voltage source;

FIG. 2 described earlier illustrates another circuit of the prior art in which provision is made for a single writing and erasure voltage source;

Figure 1:
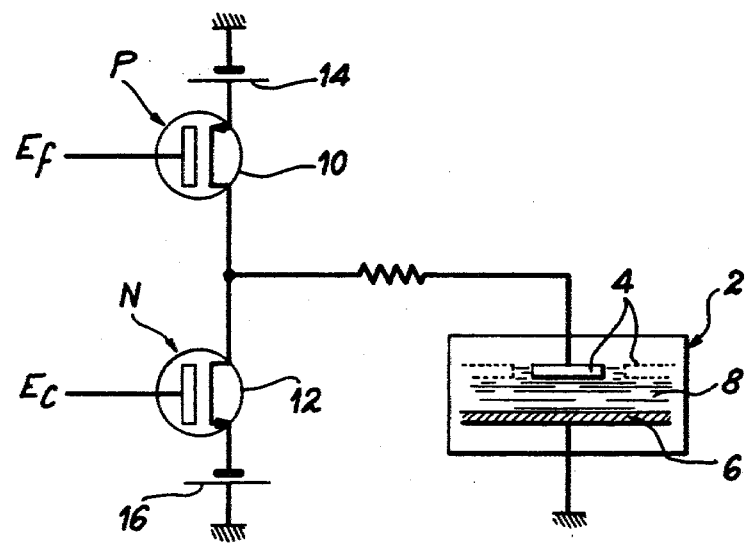
Figure 2:
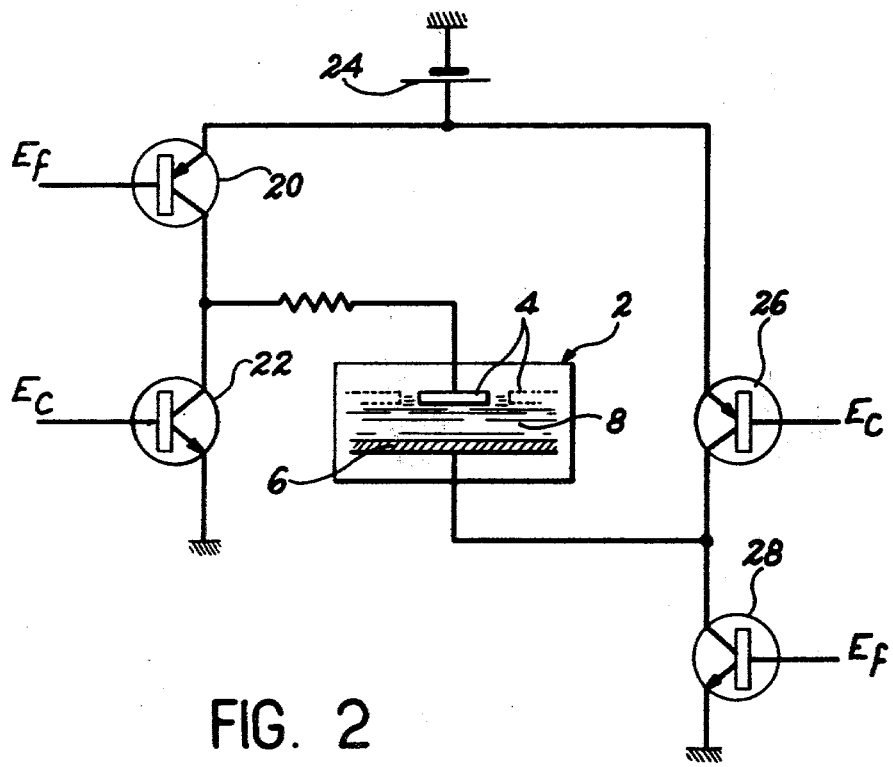
Figure 3:
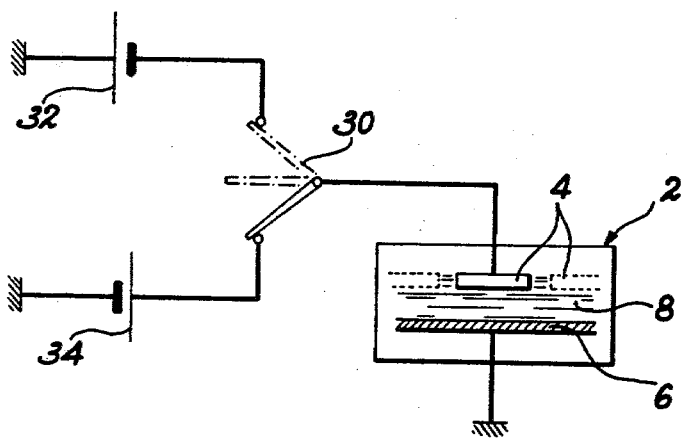
FIG. 3 is a schematic diagram of a control circuit according to the invention.

FIGS. 1 and 2 have already been described in the introductory part of this description. Consideration will now be given to the circuit according to the invention as shown diagrammatically in FIG. 3. In the electrolytic display cell 2, the electrodes 4 of said cell are connected to a switching element 30 and the counter-electrode 6 is connected to ground. The electrolyte 8 consists of a metal halide such as silver iodide, for example. The switching element 30 connects the electrode 4 either to a negative writing voltage source 32 or to a positive erasure voltage source 34. Provision is also made for an intermediate position which serves to maintain the written state.

According to the invention, the source 34 delivers an erasure voltage which is close in value to the threshold voltage of electrochemical formation of the halogen which corresponds to the metal halide of the electrolyte 8. When said halide consists of silver iodide and the counter-electrode is of silver, the threshold iodine formation voltage is of the order of 0.7 V. This is the voltage delivered by the source 34.

Figure 4:
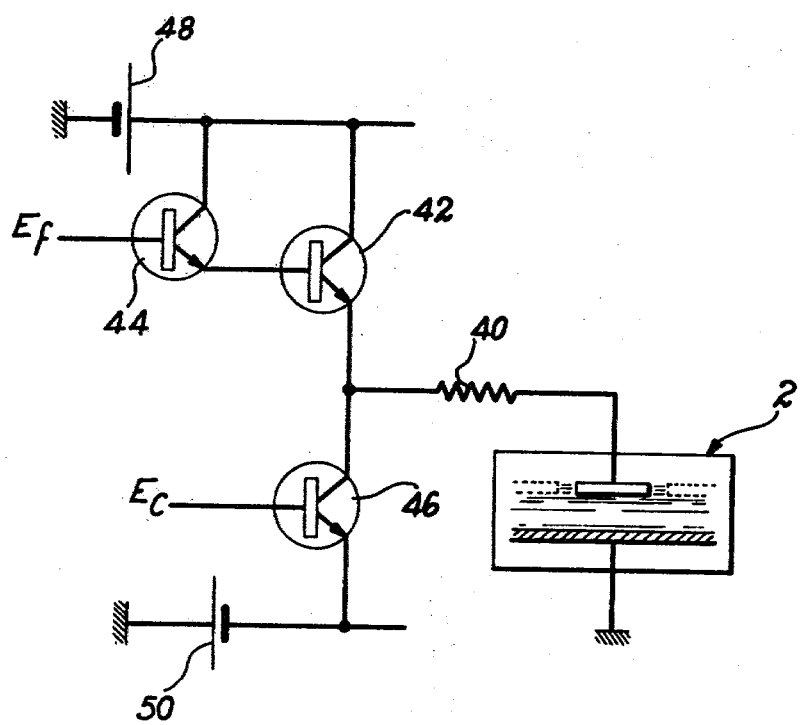
FIG. 4 shows a particular embodiment of the circuit according to the invention.

The diagram of FIG. 4 shows a particular embodiment of a circuit according to the invention which takes advantage of the emitter-base voltage drop in a transistor in order to obtain a suitable erasure voltage.

The circuit shown in FIG. 4 comprises a resistor 40, erasure transistors 42 and 44, a writing transistor 46, two dry cells 48 and 50 each having a voltage of approximately 1.5 V and two leads Ef and Ec which serve to control the erasing and writing operations.

The correspondence between the voltages applied to the leads Ef and Ec and the operations controlled by this circuit is set forth in the following table:

| Operation | $E_{c(V)}$ | $E_{f(V)}$ |
|---|---|---|
| Writing | +1.5 | −1.5 |
| Holding in written state | −1.5 | −1.5 |
| Erasure or holding in erased state | −1.5 | +1.5 |

The emitter-base voltage drop of the erasure transistors 42 and 44 is approximately 0.4 V in the case of a low emitter current, with the result that a voltage of approximately 0.7 V is allowed to remain in the display device 2. This voltage is slightly higher than the voltage required for the formation of iodine on the electrode.

The method and the circuit according to the invention are well suited to an original control of electrolytic display devices in which one displayed character is changed to another character by applying an intermediate writing signal on those electrodes which have not been written on the preceding character. This method of control makes it possible to overcome the disadvantage mentioned above in connection with systems of the prior art and simplifies the control means as will now be described with reference to FIGS. 5 and 6.

Figure 5:
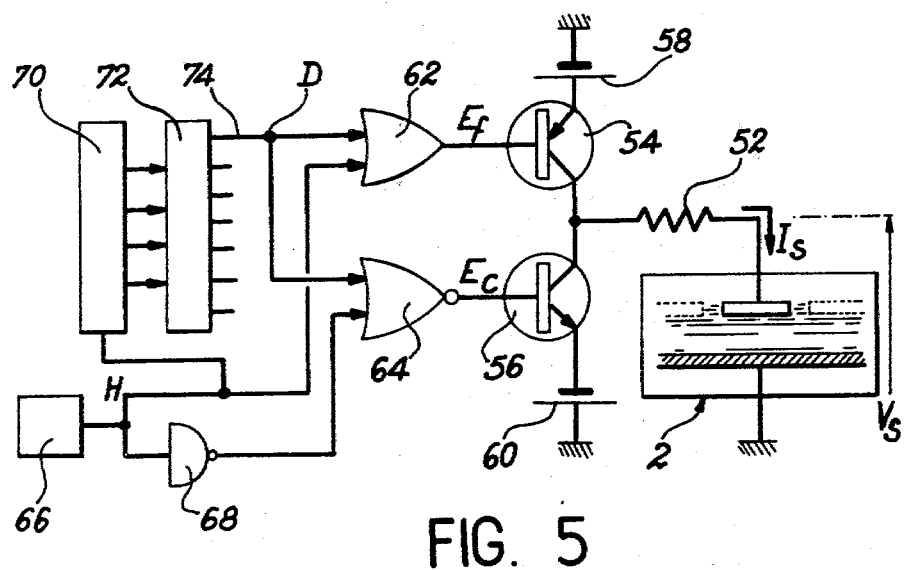
FIG. 5 shows an alternative embodiment of the control circuit according to the invention in which the transition from one displayed character to another character is effected by means of a state in which all the electrodes are excited.

The control circuit shown in FIG. 5 comprises a resistor 52 placed between one electrode of the display cell 2 and the collectors of two transistors 54 and 56, the emitters of which are connected respectively to a positive voltage source 58 (having a value within the range of 0.5 to 0.8 V) and a negative voltage source 60 (having a value in the vicinity of −1.5 V). The bases of these transistors are connected through leads Ef and Ec to the outputs of two logical gates respectively of the OR type (gate 62) and of the NOR type (gate 64). These gates are controlled by pulses delivered by a clock pulse generator 66, directly in the case of the gate 62 and after inversion by an inverter gate 68 in the case of the gate 64. A counter 70 receives the pulses from the clock pulse generator 66 and supplies a decoder 72 having a number of outputs corresponding to the number of electrodes. The output 74 shown in the figure carries a binary signal having the value "1" or "0," depending on the operation to be performed on the electrode of the display cell.

FIG. 5 also mentions different symbols for voltages or currents which appear at different points of the circuit:

H for the pulses delivered by the clock pulse generator 66,
D for the signal delivered by the decoder 72,
Vs for the voltage applied to the electrode,
Is for the current which flows through said electrode,
Ef and Ec for the erasure and writing voltages applied to the bases of the transistors.

Figure 6:
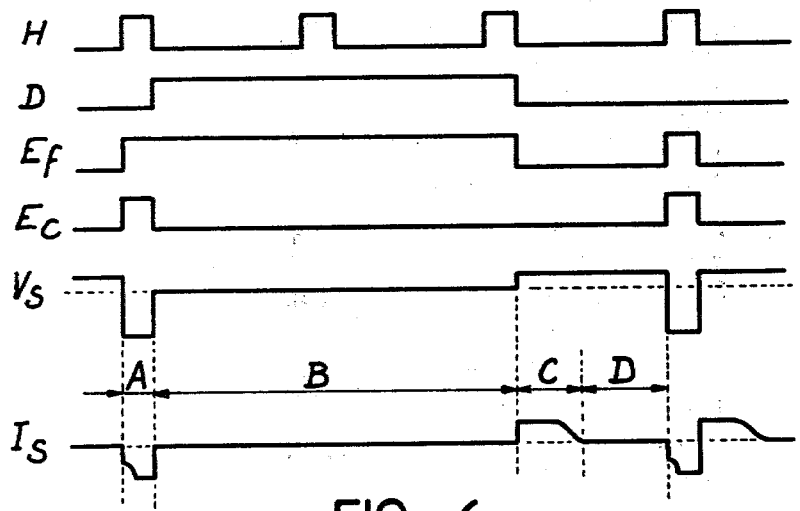
FIG. 6 is a chronogram of different signals which appear in the circuit of FIG. 5.

The operation of this circuit is described with reference to the chronograms of FIG. 6 which illustrate the variations in these different values. The bottom line relating to the current Is indicates the different operations performed on the display cell, namely:
A: writing,
B: written state,
C: erasing,
D: erased state.

It will be noted that the circuit of FIG. 5 delivers a writing pulse before each change of state of the decoder (during phase A). This involves a change of display from one character to another character by means of a uniform writing state. For example, when changing from the display of a 2 to the display of a 3 by means of a seven-segment device, the following sequence of characters is observed:

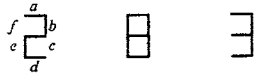

the intermediate character being obtained precisely by means of the writing pulse which corresponds to phase A.

Although this sequence consumes slightly more power (25%) than the ideal sequence which would consist in erasing the segment "e" then in writing the segment "c," it still consumes much less energy than the sequence which consists in erasing the segments "a, b, d, e, g," then in writing the segments "a, b, c, d, g."

Throughout the foregoing description, the erasure voltage source can be made dependent on the impedance of a reference electrode placed within the cell. A variable which controls an electrolytic display cell and is controlled in dependence on the impedance of a reference electrode forms the subject of French patent application No. EN 78 18224 filed on June 19, 1978.

The invention has been described in the case of a metal halide electrolytic display cell in accordance with French patent application No. EN 76 18919 of June 22, 1976. It is apparent, however, that the scope of the invention is broader in this instance.

In point of fact, if the erasure voltage employed is lower than the threshold voltage corresponding to the initial parasitic reaction which is liable to arise in the electrolyte after disappearance of the metallic film layer, no parasitic reaction is likely to form. There is therefore no a priori need to apply the principle described in the patent Application cited earlier.

After this description, it can be observed that the principle of automatic stopping of the erasure is fairly difficult to apply in a display cell. Although the erasure control voltage is of low value, the erasure time is long and often prohibitive. Thus it is possible in fact to employ either a combination of both alternative embodiments hereinabove described, namely the embodiment in which a relatively high continuous erasure current serves to remove all traces of silver followed by the embodiment in which the erasure voltage employed is lower than the threshold voltage, or a combination of two sequences consisting of different continuous erasure currents of high initial value for a limited period of time and then of low value for the time that is left.

A further observation is that the concept which naturally occurs to those versed in the art of electrolytic display consists in adjusting the equality of charges and that the means provided by the invention do not clearly follow from the prior art as a logical consequence.

We claim:

1. A method of control of an electrolytic display cell in which said cell comprises a plurality of electrodes having shapes suited to the display of characters, a counter-electrode and an electrolyte, in which a negative voltage is applied to one of the electrodes in order to initiate writing on said electrode and a positive voltage pulse is applied to said electrode in order to initiate erasure and in which the voltage between said electrode and said counter-electrode on completion of erasure has a tendency to rise to a threshold value corresponding to the production of a parasitic reaction, wherein the end of the erasure pulse is determined by the instant at which the electrode—counter-electrode voltage rises to the threshold voltage corresponding to the production of a parasitic reaction.

2. A method of control according to claim 1, wherein the erasure voltage applied is lower than the parasitic reaction threshold voltage.

3. A method of control according to claim 1, wherein the electrolyte has a metal halide base, said parasitic reaction being the electrochemical formation of the corresponding halogen.

4. A method of control according to claim 1, wherein said method consists in applying an erasure voltage of slightly higher value than said threshold voltage.

5. A method according to claim 1, wherein the erasure voltage is controlled in dependence on the impedance of a reference electrode placed within the cell.

* * * * *